(12) United States Patent
Caffrey

(10) Patent No.: US 10,169,719 B2
(45) Date of Patent: Jan. 1, 2019

(54) USER CONFIGURABLE MESSAGE ANOMALY SCORING TO IDENTIFY UNUSUAL ACTIVITY IN INFORMATION TECHNOLOGY SYSTEMS

(71) Applicant: INTERNATIONAL BUSINESS MACHINES CORPORATION, Armonk, NY (US)

(72) Inventor: James M. Caffrey, Woodstock, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 14/887,355

(22) Filed: Oct. 20, 2015

(65) Prior Publication Data
US 2017/0111378 A1    Apr. 20, 2017

(51) Int. Cl.
*H04L 29/06* (2006.01)
*H04L 12/24* (2006.01)
*G06N 99/00* (2010.01)

(52) U.S. Cl.
CPC ......... *G06N 99/005* (2013.01); *H04L 41/069* (2013.01); *H04L 63/1408* (2013.01); *H04L 41/142* (2013.01)

(58) Field of Classification Search
CPC ................ H04L 63/1425; G06N 99/005
See application file for complete search history.

(56) References Cited

U.S. PATENT DOCUMENTS

| | | | | |
|---|---|---|---|---|
| 5,602,918 | A * | 2/1997 | Chen | G06Q 20/341 380/281 |
| 6,092,200 | A * | 7/2000 | Muniyappa | H04L 63/0272 713/100 |
| 6,751,729 | B1 * | 6/2004 | Giniger | H04L 63/0272 713/153 |

(Continued)

OTHER PUBLICATIONS

List of IBM Patents or Patent Applictions Treated as Related; (Appendix P), Date Filed Mar. 22, 2016, 2 pages.

(Continued)

*Primary Examiner* — John B King
*Assistant Examiner* — Darshan I Dhruv
(74) *Attorney, Agent, or Firm* — Cantor Colburn LLP; William A. Kinnaman, Jr.

(57) ABSTRACT

Embodiments include method, systems and computer program products for identifying unusual activity in an IT system based on user configurable message anomaly scoring. Aspects include receiving a message stream for the IT system and selecting a plurality of messages from the message stream that correspond to an interval. Aspects also include determining a message anomaly score for each of the plurality of the messages, wherein the message anomaly score for each of the plurality of the messages is determined to be one of a default message anomaly score and a custom message anomaly score and calculating an interval anomaly score for the interval by adding the message anomaly score for each of the plurality of the messages. Aspects further include identifying a priority level of the interval by comparing the interval anomaly score to one or more thresholds.

9 Claims, 5 Drawing Sheets

(56) References Cited

U.S. PATENT DOCUMENTS

| | | | |
|---|---|---|---|
| 7,000,121 B2* | 2/2006 | Jarosz | H04L 43/10 713/151 |
| 7,055,171 B1* | 5/2006 | Martin | H04L 12/4641 370/352 |
| 7,096,494 B1* | 8/2006 | Chen | G06Q 20/04 380/259 |
| 7,251,829 B1 | 7/2007 | Pagdin et al. | |
| 7,526,670 B2* | 4/2009 | Lloyd | G06F 11/3447 714/4.1 |
| 7,725,933 B2* | 5/2010 | Fascenda | H04L 63/0272 726/17 |
| 8,055,757 B2 | 11/2011 | Watkins | |
| 8,676,568 B2 | 3/2014 | Minegishi et al. | |
| 8,682,899 B2 | 3/2014 | Sonoda et al. | |
| 8,837,725 B2* | 9/2014 | Teruyama | H04L 9/0894 380/255 |
| 9,053,420 B2* | 6/2015 | Adibi | G06N 5/02 |
| 9,112,895 B1* | 8/2015 | Lin | H04L 63/1416 |
| 9,348,943 B2* | 5/2016 | Bullotta | G06F 17/30283 |
| 2002/0019932 A1* | 2/2002 | Toh | H04L 9/0894 713/155 |
| 2002/0152373 A1* | 10/2002 | Sun | H04L 63/0209 713/150 |
| 2003/0191937 A1* | 10/2003 | Balissat | H04L 63/0272 713/163 |
| 2005/0086197 A1* | 4/2005 | Boubez | H04L 63/10 |
| 2005/0102509 A1* | 5/2005 | Fascenda | G06Q 20/02 713/165 |
| 2006/0005011 A1* | 1/2006 | Satoh | G06F 21/33 713/156 |
| 2006/0020782 A1* | 1/2006 | Kakii | H04L 9/3263 713/156 |
| 2006/0090074 A1* | 4/2006 | Matoba | H04L 63/0272 713/171 |
| 2006/0136717 A1* | 6/2006 | Buer | H04L 9/3234 713/155 |
| 2007/0180522 A1* | 8/2007 | Bagnall | G06F 21/55 726/22 |
| 2007/0294187 A1* | 12/2007 | Scherrer | G06Q 20/401 705/75 |
| 2009/0077663 A1* | 3/2009 | Sun | H04L 63/1416 726/23 |
| 2009/0240941 A1* | 9/2009 | Lee | H04L 12/66 713/169 |
| 2009/0287922 A1* | 11/2009 | Herwono | H04L 9/0822 713/155 |
| 2010/0031358 A1* | 2/2010 | Elovici | H04L 41/147 726/24 |
| 2010/0034207 A1* | 2/2010 | Mcgrew | H04L 45/50 370/401 |
| 2010/0223458 A1* | 9/2010 | McGrew | H04L 9/0833 713/153 |
| 2010/0325719 A1* | 12/2010 | Etchegoyen | H04L 63/0272 726/15 |
| 2012/0136676 A1* | 5/2012 | Goodall | G06Q 10/0635 705/2 |
| 2012/0137367 A1* | 5/2012 | Dupont | G06F 21/00 726/25 |
| 2012/0210429 A1* | 8/2012 | Stute | C12Q 1/6804 726/23 |
| 2012/0278477 A1* | 11/2012 | Terrell | H04L 41/5009 709/224 |
| 2013/0013702 A1 | 1/2013 | Ebisawa et al. | |
| 2013/0111019 A1* | 5/2013 | Tjew | G06F 15/18 709/224 |
| 2014/0006330 A1* | 1/2014 | Biem | G06F 11/0751 706/46 |
| 2015/0020080 A1 | 1/2015 | Simsek et al. | |
| 2015/0269157 A1* | 9/2015 | Biem | G06N 99/005 707/603 |
| 2015/0271047 A1* | 9/2015 | McLean | H04L 43/50 709/224 |
| 2015/0379430 A1* | 12/2015 | Dirac | G06N 99/005 706/12 |
| 2016/0028758 A1* | 1/2016 | Ellis | G06F 21/52 726/25 |
| 2016/0086097 A1* | 3/2016 | Zhang | G06N 99/005 706/12 |
| 2016/0226737 A1* | 8/2016 | Boubez | H04L 43/0876 |
| 2017/0054744 A1* | 2/2017 | Mumcuoglu | H04L 63/1441 |
| 2017/0195289 A1* | 7/2017 | Sun | H04L 63/0209 |

OTHER PUBLICATIONS

U.S. Appl. No. 14/887,354, filed Oct. 20, 2015; Entitled: Identifying Intervals of Unusual Activity in Information Technology Systems.
U.S. Appl. No. 15/065,907, filed Mar. 10, 2016; Entitled: Identifying Intervals of Unusual Activity in Information Technology Systems.
Ein-Dor et al., "Analytics for resiliency in the mainframe" IBM J. Res. & Dev. vol. 57, No. 5 Paper 8 Sep./Oct. 2013; pp. 8:1-8:5.
List of IBM Patents or Patent Applications Treated as Related—Date Filed: Oct. 20, 2015; 2 pages.
Loveland et al., "Testintg z/OS: The premier operating system for IBM's zSeries server", IBM Systems Journal, vol. 41, No. 1, 2002, pp. 55-73.

\* cited by examiner

USER CONFIGURABLE MESSAGE ANOMALY SCORING TO IDENTIFY UNUSUAL ACTIVITY IN INFORMATION TECHNOLOGY SYSTEMS

BACKGROUND

The present disclosure relates to information technology (IT) systems, and more specifically, to methods, systems and computer program products for user configurable message anomaly scoring in an IT system to identify unusual activity.

Today's complex IT systems, such as integrated data centers, require a team of experts to monitor various system messages for abnormal behavior, and to diagnose and fix anomalies before they result in systems failures and outages. These tasks are costly and difficult for many reasons, including the fact that a variety of everyday changes can cause system anomalies in the operation of the IT system. In typical complex IT systems, the number of status messages created by the components of the IT system far exceed what can reasonably be read and analyzed by the team of IT experts. As a result, automated systems have been developed for reviewing and filtering these status messages.

Currently available automated systems for reviewing status messages are configured by a domain expert to identify a subset of messages as critical, important, interesting, uninteresting(noise) using the domain knowledge about the system and then to assign an arbitrary score to each of the message based on their classification. In some systems, the messages are then grouped into intervals and a combined score is calculated for the interval. If the calculated score of an interval is greater than an arbitrarily fixed level, the interval is marked as being unusual. Once an interval is marked as unusual, the interval it is selected for further analysis by one of the systems experts.

SUMMARY

In accordance with an embodiment, a method for identifying unusual activity in an information technology (IT) system based on user configurable message anomaly scoring is provided. The method includes receiving a message stream for the IT system and selecting a plurality of messages from the message stream that correspond to an interval. The method also includes determining a message anomaly score for each of the plurality of the messages, wherein the message anomaly score for each of the plurality of the messages is determined to be one of a default message anomaly score and a custom message anomaly score and calculating an interval anomaly score for the interval by adding the message anomaly score for each of the plurality of the messages. The method further includes identifying a priority level of the interval by comparing the interval anomaly score to one or more thresholds.

In accordance with another embodiment, a system for identifying unusual activity in an information technology (IT) system based on user configurable message anomaly scoring includes a processor in communication with one or more types of memory. The processor is configured to receive a message stream for the IT system and to select a plurality of messages from the message stream that correspond to an interval. The processor is also configured to determine a message anomaly score for each of the plurality of the messages, wherein the message anomaly score for each of the plurality of the messages is determined to be one of a default message anomaly score and a custom message anomaly score and calculate an interval anomaly score for the interval by adding the message anomaly score for each of the plurality of the messages. The processor is further configured to identify a priority level of the interval by comparing the interval anomaly score to one or more thresholds.

In accordance with a further embodiment, a computer program product for identifying unusual activity in an information technology (IT) system based on user configurable message anomaly scoring includes a non-transitory storage medium readable by a processing circuit and storing instructions for execution by the processing circuit for performing a method. The method includes receiving a message stream for the IT system and selecting a plurality of messages from the message stream that correspond to an interval. The method also includes determining a message anomaly score for each of the plurality of the messages, wherein the message anomaly score for each of the plurality of the messages is determined to be one of a default message anomaly score and a custom message anomaly score and calculating an interval anomaly score for the interval by adding the message anomaly score for each of the plurality of the messages. The method further includes identifying a priority level of the interval by comparing the interval anomaly score to one or more thresholds.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for identifying unusual activity in an information technology (IT) system based on user configurable message anomaly scoring are provided. In exemplary embodiments, a historical set of IT messages for an IT system is analyzed to identify patterns in the historical set of message and the statistical behavior of messages. This information is used to create a default anomaly score for each message. However, if the IT professional (domain expert) has assigned a message to a special group, a custom message anomaly score for messages belonging to the group is used in place of its default score. As new incoming messages are received, they are grouped into intervals and an interval score is calculated.

The calculated interval score is then compared to the one or more priority level cutoffs to determine if the interval should be marked as unusual.

Figure 1:
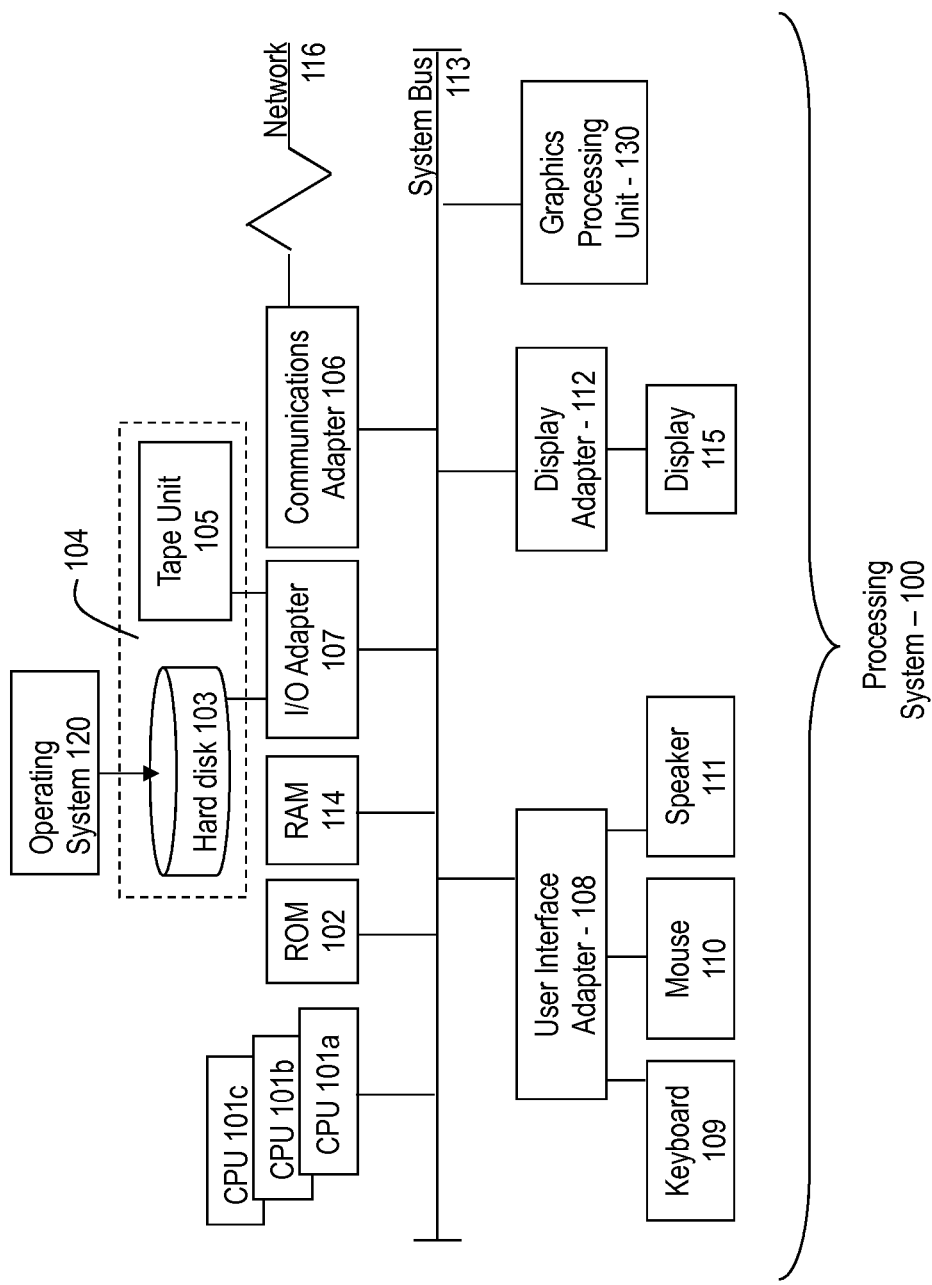
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
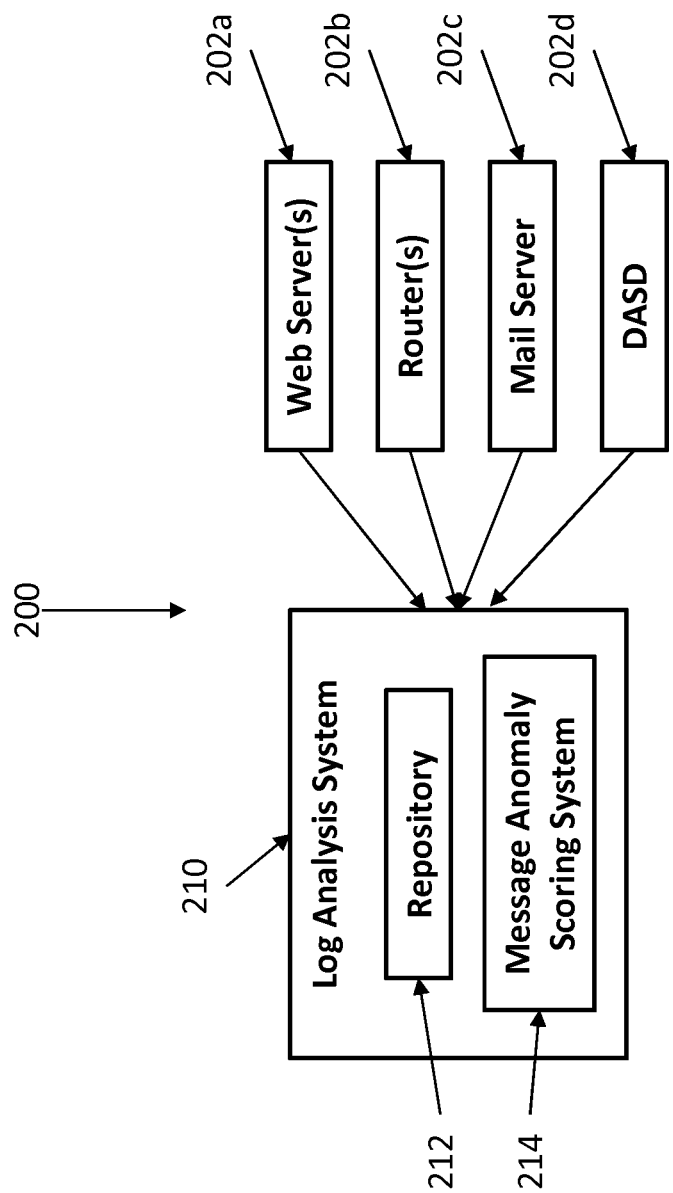
FIG. 2 is a block diagram illustrating an information technology system in accordance with an exemplary embodiment.

Referring now to FIG. 2, an information technology (IT) system 200 in accordance with an embodiment is illustrated. As illustrated, the IT system 200 includes a plurality of pieces of IT equipment 202 which may include, but are not limited to, a web server 202a, a router 202b, a mail server 202c and a direct access storage device (DASD) 202d. The IT system 200 also includes a log analysis system 210, which may be a processing system similar to the one shown in FIG. 1. The log analysis system 210 includes a repository 212 for storing status messages received from the plurality of pieces of IT equipment 202. In exemplary embodiments, the pieces of IT equipment 202 are configured to generate status messages during their operation and to transmit these status messages to the log analysis system 210. The log analysis system 210 receives the status messages from the plurality of pieces of IT equipment 202 and stores them in the repository 212.

The log analysis system 210 is configured to perform an analysis on the stored status messages to identify potential problems in the IT system 200. In one embodiment, the log analysis system 210 includes a message anomaly scoring system 214 that is configured to analyze each status message and to assign a message anomaly score to the message based on a set of rules or from a detailed statistical analysis of the historical message behavior. In another embodiment, the log analysis system 210 receives status messages which include a message anomaly score that have been assigned by a piece of IT equipment that generated the status message. In exemplary embodiments, the log analysis system 210 receives status messages and stores the messages in the repository 212 along with the message anomaly score for each message.

In currently available systems, the message anomaly scores are used by the log analysis system 210 to generate alerts to IT experts to notify the IT experts of potential issues in the IT system 200. However, each IT system 200 is different and the IT professionals in charge of the various systems often have different tolerances for the risks of different types of failures to the IT systems. As a result, the number of alerts reviewed by the IT experts may often to too high, resulting in many false positives, or too low, resulting in potential unexpected failures. Accordingly, what is needed is a method of allowing an IT expert to provide their domain knowledge about the behavior of specific messages. Certain messages even if they occur in a recognized pattern, or at a different frequency, should get a message anomaly score that will correctly influence the interval anomaly score. However, the IT expert cannot determine the specific message anomaly score because it may change with each creation of the model. Instead, the IT expert needs to assign these messages to a category like critical or uninteresting.

In exemplary embodiments, the message anomaly scoring system 214 is configured to analyze each status message and to assign a message anomaly score to the message based on a set of rules. This set of rules is based on a statistical analysis of a set of stored previous messages in the IT system, such as the frequency of a message, a grouping of messages, and the like. In addition, the rules used by the message anomaly scoring system 214 to assign a message anomaly score to each message may include a set of custom scoring rules that are learned or trained based on input from an IT professional. For example, in a given IT system an IT professional may want to set a pre-determined message anomaly score for a given message and may want the message anomaly scoring system 214 to identify similar types of messages and have the message anomaly scoring system 214 assign the similar messages the same pre-determined message anomaly score.

Figure 3:
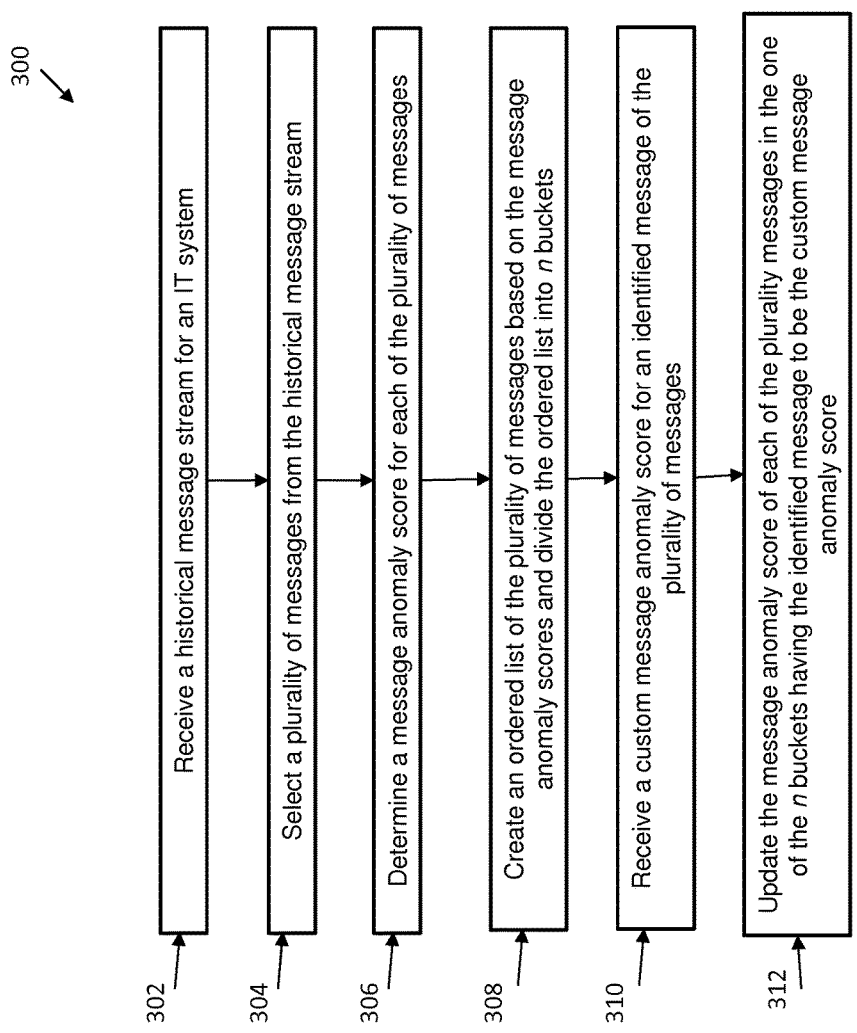
FIG. 3 is a flow diagram of a method for training a message anomaly scoring system in accordance with an exemplary embodiment.

Referring now to FIG. 3, a flow diagram of a method 300 for training a message anomaly scoring system in accordance with an exemplary embodiment is shown. As shown at block 302, the method 300 includes receiving a historical message stream for an IT system. For example, the log analysis system may retrieve a saved message stream for a given day from the repository. Next, as shown at block 304, the method 300 includes selecting a plurality of messages from the historical message stream. The method 300 also includes determining a message anomaly score for each message, as shown at block 306. In exemplary embodiments, the message anomaly score can be determined by applying known statistical analysis and calculations of patterns of message traffic. In other embodiments, the message anomaly score is generated by the piece of IT equipment that created the message and is included in the message.

Next, as shown at block 308, the method 300 also includes creating an ordered list of the plurality of messages based on the message anomaly scores dividing the ordered list into n buckets. In exemplary embodiments, the plurality of messages are evenly divided into each of the n buckets. The method 300 also includes receiving a custom message anomaly score for an identified message of the plurality of messages, as shown at block 310. For example, an IT professional may identify a specific message, or type of message, in the plurality of messages and may input a custom message anomaly score that will be used instead of the message anomaly score determined in block 306. Next, as shown at block 312, the method 300 includes updating the message anomaly score, as determined in block 306, of each of the plurality messages in the one of the n buckets that includes the identified message with the custom message anomaly score.

In exemplary embodiments, due to the large number of status messages received, the log analysis system may be configured to group incoming status messages into temporal groups, or intervals. In these embodiments, the log analysis system will track an interval anomaly score for each interval. In one embodiment, the interval anomaly score may be the sum of all of the anomaly scores (either default or custom) for all of the status messages assigned to an interval.

Figure 4:
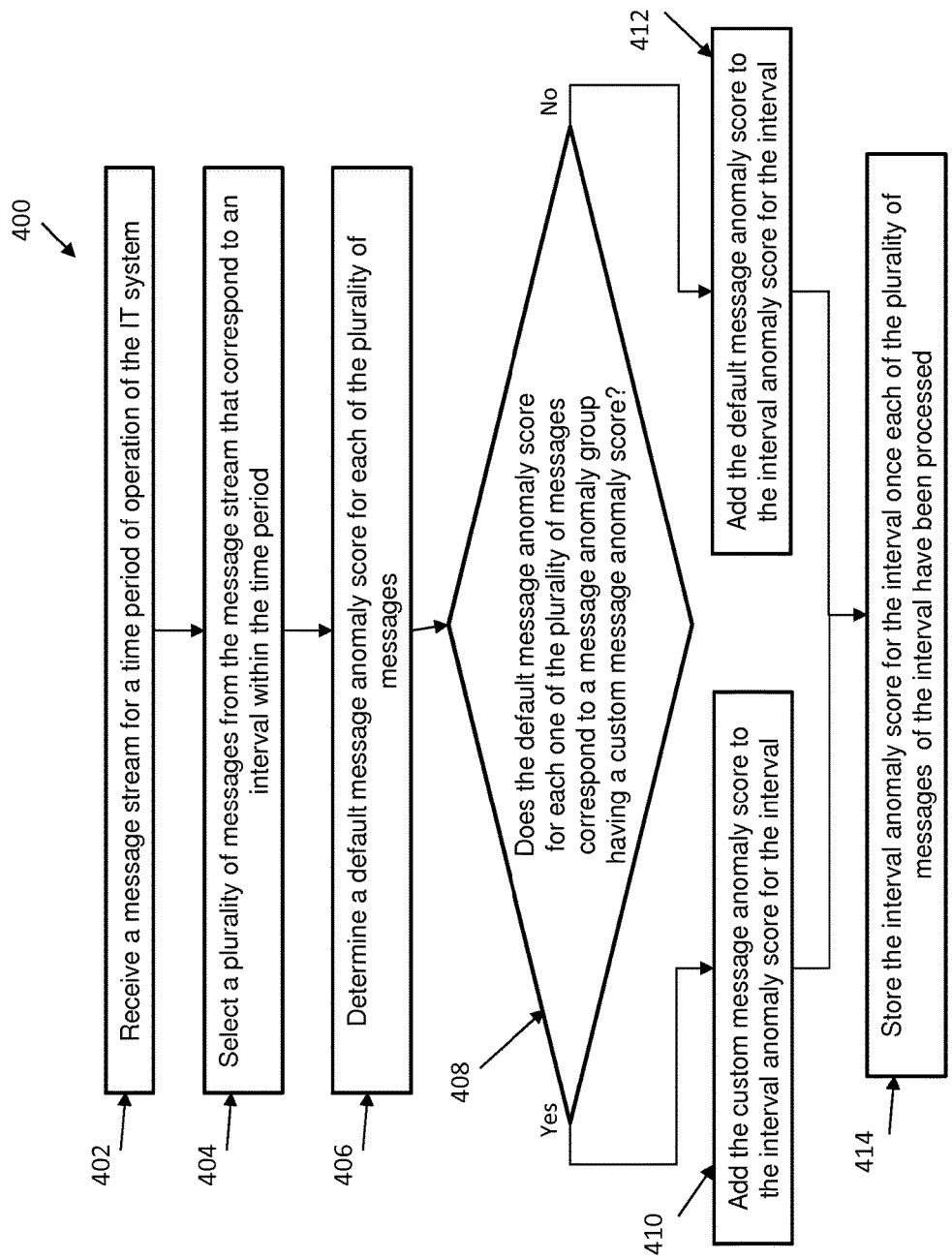
FIG. 4 is a flow diagram of a method for calculating an interval anomaly score using a trained message anomaly scoring system in accordance with an exemplary embodiment.

Referring now to FIG. 4, a flow diagram of a method 400 for calculating an interval anomaly score using a trained message anomaly scoring system in accordance with an exemplary embodiment is shown. As shown at block 402, the method 400 includes receiving a message stream for a time period of operation of the IT system. Next, as shown at block 404, the method 400 includes selecting a plurality of messages from the message stream that correspond to an interval within the time period. The method 400 also includes determining a default message anomaly score for each message, as shown at block 406. In exemplary embodiments, the default message anomaly score can be determined by applying known statistical analysis and calculations of patterns of message traffic. In other embodiments, the message anomaly score is generated by the piece of IT equipment that created the message and is included in the message.

Next, as shown at decision block 408, the method 400 includes determining if the default message anomaly score for each one of the plurality of messages corresponds to a message anomaly group having a custom message anomaly score. The message anomaly group is one of the n groups of messages that include a message identified during training of the message anomaly scoring system as having a custom message anomaly score. If the default message anomaly score for each one of the plurality of messages corresponds to a message anomaly group having a custom message anomaly score, the method 400 proceeds to block 410 and adds the custom message anomaly score to an interval anomaly score for the interval. Otherwise, the method 400 proceeds to block 412 and adds the default message anomaly score to the interval anomaly score for the interval. Next, as shown at block 414, the method 400 includes storing the interval anomaly score for the interval once each of the plurality of messages of the interval have been processed.

In exemplary embodiments, the appropriate message anomaly score can be learned for messages which have been assigned to a category based on the knowledge of an IT professional. The message anomaly score for each category of messages will reflect the message anomaly score for messages with a similar statistical behavior. The message anomaly score for critical messages will match the message anomaly score for very unusual messages while the message anomaly score for uninteresting message will match the message anomaly score for very frequent messages.

Figure 5:
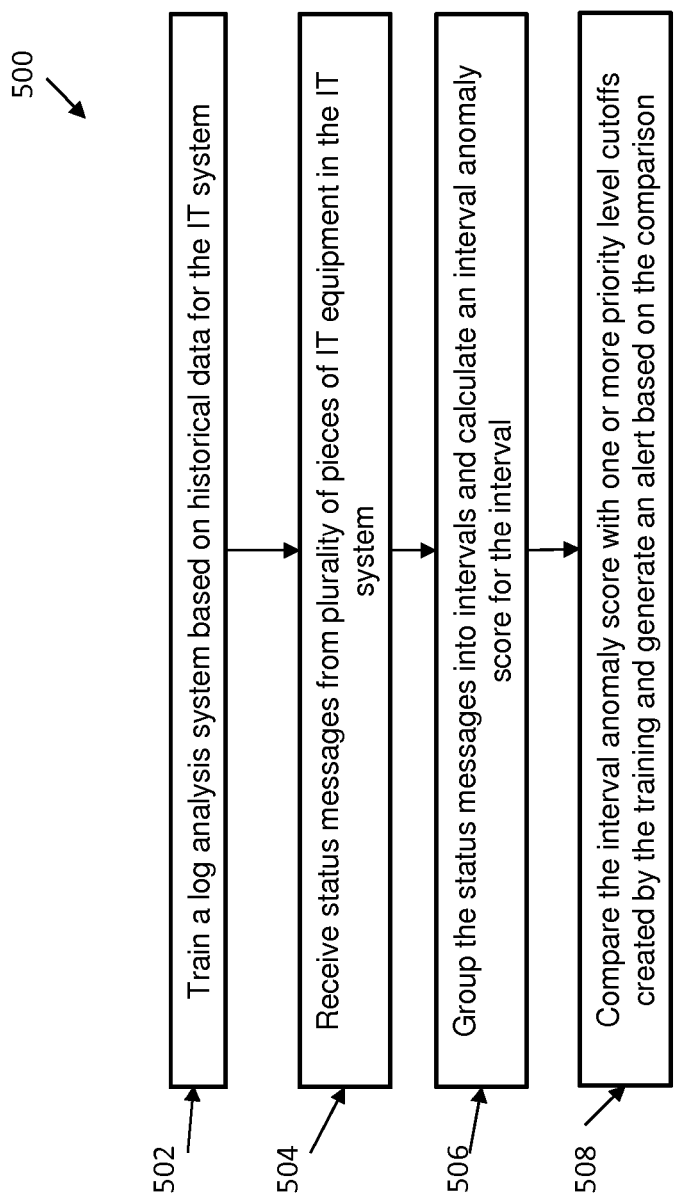
FIG. 5 is a flow diagram of a method for identifying unusual intervals in an IT system in accordance with an exemplary embodiment.

Referring now to FIG. 5, a flow chart diagram of a method for identifying unusual intervals in an IT system in accordance with an exemplary embodiment is shown. As shown at block 502, the method 500 includes training a log analysis system based on historical data for the IT system. In exemplary embodiments, training a log analysis system based on historical data for the IT system includes training a message anomaly scoring system, as shown in FIG. 3. Next, shown at block 504, the method 500 includes receiving, by the log analysis system, status messages from a plurality of pieces of IT equipment in the IT system. In exemplary embodiments, the IT messages may include, or may be assigned by the log analysis system, a message anomaly score. The method 500 also includes grouping the status messages into an interval and calculating an interval anomaly score for the interval, as shown at block 506. In exemplary embodiments, calculating an interval anomaly score for the interval includes using custom message anomaly scores, as shown in FIG. 4. Next, as shown at block 508, the method 500 includes comparing the interval anomaly score with one or more priority level cutoffs and generating an alert based on the comparison.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying unusual activity in an information technology (IT) system based on user configurable message anomaly scoring, the method comprising:
    receiving, by a processing device, a message stream for the IT system;
    selecting a plurality of status messages from the message stream that correspond to an interval of time;
    determining a default message anomaly score for each status message of the plurality of the status messages of the interval, wherein the default message anomaly scores are generated by IT equipment of the IT system and are included in the plurality of status messages received from the IT equipment;
    calculating, by the processing device, an interval anomaly score for the interval by at least performing the following for each status message of the plurality of status messages of the interval:
        determining whether the default message anomaly score of the status message corresponds to a message anomaly group comprising a custom scoring group having a custom message anomaly score, wherein the custom message anomaly score of the message anomaly group is received by the processing device as an input from a system expert during training of a model of a historical message stream;
        upon determining that the default message anomaly score of the status message corresponds to the message anomaly group having the custom message anomaly score, adding the custom message anomaly score to an interval anomaly score for the interval; and
        upon determining that the default message anomaly score of the status message does not correspond to the message anomaly group having the custom message anomaly score, adding the default message anomaly score of the status message to the interval anomaly score for the interval;

identifying a priority level of the interval by comparing the interval anomaly score to one or more priority level cutoffs, wherein the one or more priority level cutoffs are established based on the trained model; and generating an alert for the selected plurality of status messages of the interval only when the identified priority level of the interval meets the one or more priority level cutoffs based on the comparison, wherein the alert flags the interval such that only the selected plurality of status message of the message stream are transmitted to the system expert.

2. The method of claim 1, wherein the model of the historical message stream is trained by:

dividing a plurality of historical status messages into a number of groups based on the default message anomaly score of each of the plurality of historical status messages;

identifying a specific status message from the plurality of historical status messages; and identifying the group containing the specific message as custom scoring group.

3. The method of claim 2, wherein determining whether the default message anomaly score of the status message corresponds to the message anomaly group includes determining whether each one of the plurality of the status messages is a member of the custom scoring group.

4. A computer program product for identifying unusual activity in an IT system based on user configurable message anomaly scoring, the computer program product comprising:

a non-transitory storage medium readable by a processing circuit and storing instructions for execution by the processing circuit for performing a method comprising:

receiving a message stream for the IT system;

selecting a plurality of status messages from the message stream that correspond to an interval of time;

determining default message anomaly score for each status message of the plurality of the status messages of the interval, wherein the default message anomaly scores are generated by IT equipment of the IT system and are included in the plurality of status messages received from the IT equipment;

calculating an interval anomaly score for the interval by at least performing the following for each status message of the plurality of status messages of the interval;

determining whether the default message anomaly score of the status message corresponds to a message anomaly group comprising a custom scoring group having a custom message anomaly score, wherein the custom message anomaly score of the message anomaly group is received as an input from a system expert during training of a model of a historical message stream;

upon determining that the default message anomaly score of the status message corresponds to the message anomaly group having the custom message anomaly score, adding the custom message anomaly score to an interval anomaly score for the interval; and upon determining that the default message anomaly score of the status message does not correspond to the message anomaly group having the custom message anomaly score, adding the default message anomaly score of the status message to the interval anomaly score for the interval;

identifying a priority level of the interval by comparing the interval anomaly score to one or more priority level cutoffs, wherein the one or more priority level cutoffs are established based on the trained model; and generating an alert for the selected plurality of status messages of the interval only when the identified priority level of the interval meets the one or more priority level cutoffs based on the comparison, wherein the alert flags the interval such that only the selected plurality of status message of the message stream are transmitted to the system expert.

5. The computer program product of claim 4, wherein the model of the historical message stream is trained by:

dividing a plurality of historical status messages into a number of groups based on the default message anomaly score of each of the plurality of historical status messages;

identifying a specific status message from the plurality of historical status messages; and identifying the group containing the specific message as custom scoring group.

6. The computer program product of claim 5, wherein determining whether the default message anomaly score of the status message corresponds to the message anomaly group includes determining whether each one of the plurality of the status messages is a member of the custom scoring group.

7. A system for identifying unusual activity in an information technology (IT) system based on user configurable message anomaly scoring, comprising:

a processor in communication with one or more types of memory, the processor configured to:

receive a message stream for the IT system;

select a plurality of status messages from the message stream that correspond to an interval of time;

determine a default message anomaly score for each status message of the plurality of the status messages of the interval, wherein the default message anomaly scores are generated by IT equipment of the IT system and are included in the plurality of status messages received from the IT equipment;

calculate an interval anomaly score for the interval at least performing the following for each status message of the plurality of status messages of the interval:

determining whether the default message anomaly score of the status message corresponds to a message anomaly group comprising a custom scoring group having a custom message anomaly score, wherein the custom message anomaly score of the message anomaly group is received as an input from a system expert during training of a model of a historical message stream;

upon determining that the default message anomaly score of the status message corresponds to the message anomaly group having the custom message anomaly score, adding the custom message anomaly score to an interval anomaly score for the interval; and upon determining that the default message anomaly score of the status message does not correspond to the message anomaly group having the custom message anomaly score, adding the default message anomaly score of the status message to the interval anomaly score for the interval;

identify a priority level of the interval by comparing the interval anomaly score to one or more priority level cutoffs; and generating an alert for the selected plurality of status messages of the interval only when the identified priority level of the interval meets the one or more priority level cutoffs based on the comparison, wherein the alert flags the interval such that only the selected plurality of status message of the message stream are transmitted to the system expert.

8. The system of claim 7, wherein the model of the historical message stream is trained by:

dividing a plurality of historical status messages into a number of groups based on the default message anomaly score of each of the plurality of historical status messages;

identifying a specific status message from the plurality of historical status messages; and identifying the group containing the specific message as custom scoring group.

9. The system of claim 8, wherein determining whether the default message anomaly score of the status message corresponds to the message anomaly group includes determining whether each one of the plurality of the messages is a member of the custom scoring group.

\* \* \* \* \*